(12) United States Patent
Fujito (10) Patent No.: US 11,519,887 B2
(45) Date of Patent: Dec. 6, 2022

(54) ANALYSIS ASSISTANCE METHOD, ANALYSIS ASSISTANCE DEVICE, NON-TRANSITORY COMPUTER READABLE MEDIUM AND ANALYSIS SYSTEM

(71) Applicant: SHIMADZU CORPORATION, Kyoto (JP)

(72) Inventor: Yuka Fujito, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 565 days.

(21) Appl. No.: 16/571,312

(22) Filed: Sep. 16, 2019

(65) Prior Publication Data
US 2020/0166485 A1    May 28, 2020

(30) Foreign Application Priority Data
Nov. 22, 2018 (JP) .............................. JP2018-219639

(51) Int. Cl.
*G01N 30/32* (2006.01)
*G01N 30/46* (2006.01)
(Continued)

(52) U.S. Cl.
CPC ............ *G01N 30/32* (2013.01); *G01N 30/46* (2013.01); *G06F 9/542* (2013.01);
(Continued)

(58) Field of Classification Search
CPC .. G01N 30/32; G01N 30/46; G01N 2030/027; G01N 2030/324; G01N 2030/328; G06F 9/542
See application file for complete search history.

(56) References Cited

U.S. PATENT DOCUMENTS 3,240,052 A * 3/1966 Reinecke ............... G01N 30/32
137/81.1
4,984,602 A * 1/1991 Saito ...................... G01N 30/32
251/129.05
(Continued)

FOREIGN PATENT DOCUMENTS

JP          2004-506896 A     3/2004
WO     WO-2014189738 A2 * 11/2014 ............. G01N 30/16
(Continued)

OTHER PUBLICATIONS

Communication dated Mar. 27, 2020 from the European Patent Office in application No. 19202615.1.

*Primary Examiner* — John Fitzgerald
(74) *Attorney, Agent, or Firm* — Sughrue Mion, PLLC (57) ABSTRACT

An analysis assistance method includes setting pressure in a first BPR to a value higher than a prescribed second set value with pressure in a second BPR set to a second set value, instructing a supercritical fluid chromatograph to supply a mobile phase to a supply flow path at a flow rate of the mobile phase that is to be theoretically supplied to a first flow path when the mobile phase is supplied to the supply flow path at a prescribed total flow rate and a prescribed sample introduction ratio, and gradually decreasing a set value of the pressure in the first BPR, and detecting a set value of the pressure in the first BPR at the time when supply of the mobile phase to a second flow path is stopped due to a decrease in set value of the pressure in the first BPR, as a first set value.

10 Claims, 4 Drawing Sheets

(51) Int. Cl.
  *G06F 9/54* (2006.01)
  *G01N 30/02* (2006.01)
(52) U.S. Cl.
  CPC . *G01N 2030/027* (2013.01); *G01N 2030/324* (2013.01); *G01N 2030/326* (2013.01); *G01N 2030/328* (2013.01)

(56) References Cited

U.S. PATENT DOCUMENTS

| | | | | |
|---|---|---|---|---|
| 5,180,487 A * | 1/1993 | Saito | ............... | B01D 15/1814 210/659 |
| 6,289,914 B1 | 9/2001 | Tommasi et al. | | |
| 10,359,403 B2 * | 7/2019 | Fogwill | ............... | G01N 30/32 |
| 2003/0026704 A1 * | 2/2003 | Berger | ............... | G01N 30/32 417/53 |
| 2003/0190237 A1 * | 10/2003 | Berger | ............... | F04B 49/225 417/297 |
| 2005/0155409 A1 * | 7/2005 | Niutta | ............... | G05D 16/0402 137/101.21 |
| 2008/0164193 A1 * | 7/2008 | Minoda | ............... | G01N 30/32 210/198.2 |
| 2013/0186831 A1 * | 7/2013 | Sidhu | ............... | B01D 15/10 210/656 |
| 2015/0101393 A1 * | 4/2015 | Fogwill | ............... | G01N 30/68 73/23.31 |
| 2016/0136544 A1 * | 5/2016 | Hudalla | ............... | B01D 15/163 210/656 |
| 2016/0202218 A1 | 7/2016 | Owa | | |
| 2016/0375376 A1 * | 12/2016 | Wikfors | ............... | B01D 15/163 422/537 |
| 2017/0100682 A1 * | 4/2017 | Wikfors | ............... | G01N 30/34 |
| 2017/0276652 A1 | 9/2017 | Funada et al. | | |
| 2018/0311596 A1 * | 11/2018 | Tarafder | ............... | G01N 30/32 |
| 2018/0326324 A1 * | 11/2018 | Hill | ............... | G01N 30/32 |
| 2018/0345175 A1 * | 12/2018 | Schlake | ............... | B01D 15/40 |
| 2019/0111376 A1 * | 4/2019 | Fogwill | ............... | B01D 15/163 |
| 2020/0025725 A1 * | 1/2020 | Fujito | ............... | G01N 30/36 |
| 2020/0217825 A1 * | 7/2020 | Shreve | ............... | B01D 15/40 |

FOREIGN PATENT DOCUMENTS

| | | |
|---|---|---|
| WO | 2016/031008 A1 | 3/2016 |
| WO | 2018/146826 A1 | 8/2018 |

* cited by examiner

ANALYSIS ASSISTANCE METHOD, ANALYSIS ASSISTANCE DEVICE, NON-TRANSITORY COMPUTER READABLE MEDIUM AND ANALYSIS SYSTEM

BACKGROUND OF THE INVENTION

Field of the Invention

The present invention relates to an analysis assistance method, an analysis assistance device, a non-transitory computer readable medium storing an analysis assistance program and an analysis system for assisting determination of an analysis condition in a supercritical fluid chromatograph.

Description of Related Art

A supercritical fluid chromatograph (SFC) that uses a supercritical fluid as a mobile phase has been known. In an analysis device described in WO 2016/031008 A1, an analysis column is provided in a first flow path, and a first back pressure regulating valve is provided at a downstream of the analysis column. Further, a second flow path into which the first flow path branches is provided, and a second back pressure regulating valve is provided at the second flow path. Parts of a sample and a mobile phase introduced into a supercritical fluid chromatograph are introduced into the analysis column of the first flow path, and the remaining sample and mobile phase are discharged through the second flow path.

BRIEF SUMMARY OF THE INVENTION

In the analysis device described in WO2016/031008 A1, it is possible to adjust the ratio (hereinafter referred to as a sample introduction ratio) of the amount of the sample supplied to the first flow path to the amount of the sample discharged from the second flow path by adjusting set values of the pressure in the first back pressure regulating valve and the second back pressure regulating valve. Thus, the amount of the sample to be introduced into the analysis column can be adjusted.

However, even when the set values of the pressure in the first back pressure regulating valve and the second back pressure regulating valve are respectively constant, the sample introduction ratio changes due to a pressure loss caused by pipes and the analysis column used in the analysis device. Because the change in sample introduction ratio influences detection sensitivity and analysis accuracy, it is necessary to adjust the sample introduction ratio to the value prescribed in the analysis method indicating the analysis condition by adjusting the set value of the pressure in the first back pressure regulating valve. In this case, after it is confirmed that the sensitivity of the detector of the analysis device is constant, analysis for adjustment of the sample introduction ratio must be carried out, and the set value of the pressure in the first back pressure regulating value must be adjusted by trial and error with a peak intensity acquired by the detector used as an index. Thus, it takes time and effort to make settings for analysis.

An object of the present invention is to provide an analysis assistance method, an analysis assistance device, a non-transitory computer readable medium storing an analysis assistance program and an analysis system that enable a sample introduction ratio to be easily and reliably adjusted.

An analysis assistance method according to one aspect of the present invention of assisting determination of an analysis condition of a supercritical fluid chromatograph including a liquid sender that supplies a mobile phase including a supercritical fluid to a supply flow path, first and second back pressure regulators respectively provided in first and second flow paths into which the supply flow path branches and an analysis column provided at an upstream of the first back pressure regulator in the first flow path, includes setting pressure in the first back pressure regulator to a value higher than a prescribed second set value with pressure in the second back pressure regulator set to the second set value, instructing the supercritical fluid chromatograph to supply the mobile phase to the supply flow path at a flow rate of the mobile phase that is to be theoretically supplied to the first flow path when the mobile phase is supplied to the supply flow path at a prescribed total flow rate and a prescribed sample introduction ratio, and then instructing the supercritical fluid chromatograph to gradually decrease a set value of the pressure in the first back pressure regulator, and detecting a set value of the pressure in the first back pressure regulator at the time when supply of the mobile phase to the second flow path is stopped due to a decrease in set value of the pressure in the first back pressure regulator, as a first set value.

According to the analysis assistance method, the set value of the pressure in the first back pressure regulator at the time when the supply of the mobile phase to the second flow path is stopped is equivalent to the first set value at which the predetermined flow rate of the mobile phase is supplied to the first flow path at the prescribed sample introduction ratio. Therefore, it is possible to determine the set value of the pressure in the first back pressure regulator in a short time, which is to be set in order that a desired sample introduction ratio is acquired, without carrying out the analysis. Further, it is possible to determine the set value of the pressure in the first back pressure regulator without the influence by another factor such as sensitivity of the detector. Therefore, the sample introduction ratio can be easily and reliably adjusted. The analysis assistance method may further include setting the pressure in the first back pressure regulator to the detected first set value. In this case, the pressure in the first back pressure regulator is automatically set such that the prescribed sample introduction ratio is acquired.

The analysis assistance method may further include storing the analysis condition including the prescribed sample introduction ratio, the prescribed total flow rate of the mobile phase and the prescribed second set value, and determining or updating the detected first set value as part of the analysis condition. In this case, the analysis method defining analysis condition of the sample can be easily created and updated.

The analysis assistance method may further include presenting warning when the gradually decreasing set value of the pressure in the first back pressure regulator decreases to a value lower than a predetermined threshold value. In this case, the user can be informed of an occurrence of a problem such as clogging in the first or second flow path.

An analysis assistance device according to another aspect of the present invention that assists determination of an analysis condition of a supercritical fluid chromatograph including a liquid sender that supplies a mobile phase including a supercritical fluid to a supply flow path, first and second back pressure regulators respectively provided in first and second flow paths into which the supply flow path branches and an analysis column provided at an upstream of the first back pressure regulator in the first flow path, includes a setter that sets pressure in the first back pressure regulator to a value higher than a prescribed second set value with pressure in the second back pressure regulator set to the second set value, an instructor that instructs the supercritical fluid chromatograph to supply the mobile phase to the supply flow path at a flow rate of the mobile phase that is to be theoretically supplied to the first flow path when the mobile phase is supplied to the supply flow path at a prescribed total flow rate and a prescribed sample introduction ratio, and then instructs the supercritical fluid chromatograph to gradually decrease a set value of the pressure in the first back pressure regulator, and a detector that detects a set value of the pressure in the first back pressure regulator at the time when supply of the mobile phase to the second flow path is stopped due to a decrease in set value of the pressure in the first back pressure regulator, as a first set value.

The analysis assistance device enables the sample introduction ratio to be automatically, easily and reliably adjusted.

The setter may set the pressure in the first back pressure regulator to the detected first set value. In this case, the pressure in the first back pressure regulator is automatically set such that the prescribed sample introduction ratio is acquired.

The analysis assistance device may further include a storage that stores the analysis condition including the prescribed sample introduction ratio, the prescribed total flow rate of the mobile phase and the prescribed second set value, and a determination updater that determines or updates the detected first set value as part of the analysis condition. In this case, the analysis method defining the analysis condition of the sample can be easily created and updated.

The analysis assistance device may further include a presenter that presents warning when the gradually decreasing set value of the pressure in the first back pressure regulator based on an instruction given by the instructor decreases to a value lower than a predetermined threshold value. In this case, the user can be informed of an occurrence of a problem such as clogging in the first or second flow path.

A non-transitory computer readable medium storing an analysis assistance program according to yet another aspect of the present invention for assisting determination of an analysis condition of a supercritical fluid chromatograph that includes a liquid sender that supplies a mobile phase including a supercritical fluid to a supply flow path, first and second back pressure regulators respectively provided in first and second flow paths into which the supply flow path branches and an analysis column provided at an upstream of the first back pressure regulator in the first flow path, the analysis assistance program allows a computer to execute a process of setting pressure in the first back pressure regulator to a value higher than a prescribed second set value with pressure in the second back pressure regulator set to the second set value, a process of instructing the supercritical fluid chromatograph to supply the mobile phase to the supply flow path at a flow rate of the mobile phase that is to be theoretically supplied to the first flow path when the mobile phase is supplied to the supply flow path at a prescribed total flow rate and a prescribed sample introduction ratio, and then instructing the supercritical fluid chromatograph to gradually decrease a set value of the pressure in the first back pressure regulator, and a process of detecting a set value of the pressure in the first back pressure regulator at the time when supply of the mobile phase to the second flow path is stopped due to a decrease in set value of the pressure in the first back pressure regulator, as a first set value.

The non-transitory computer readable medium storing the analysis assistance program enables the sample introduction ratio to be easily and reliably adjusted.

An analysis system according to yet another aspect of the present invention includes a supercritical fluid chromatograph including a liquid sender that supplies a mobile phase including a supercritical fluid, first and second back pressure regulators respectively provided in first and second flow paths into which the supply flow path branches and an analysis column provided at an upstream of the first back pressure regulator in the first flow path, and the above-mentioned analysis assistance device that assists determination of an analysis condition of the supercritical fluid chromatograph.

This analysis system enables the sample introduction ratio to be easily and reliably adjusted.

Other features, elements, characteristics, and advantages of the present invention will become more apparent from the following description of preferred embodiments of the present invention with reference to the attached drawings.

DESCRIPTION OF THE PREFERRED EMBODIMENTS

An analysis assistance method, an analysis assistance device, a non-transitory computer readable medium storing an analysis assistance program and an analysis system according to embodiments of the present invention will be described below in detail with reference to drawings.

(1) Configuration of Analysis System

Figure 1:
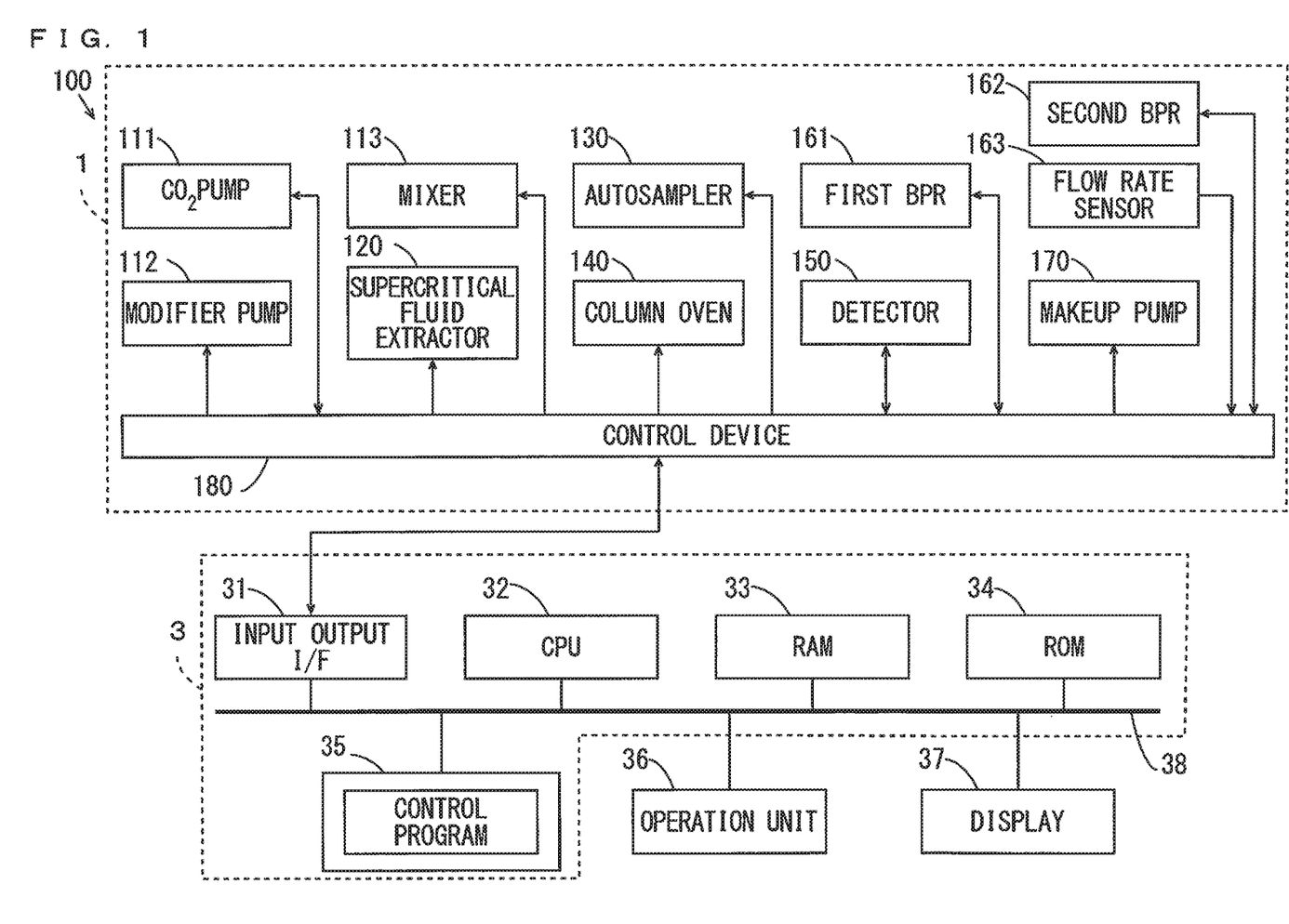
FIG. 1 is a block diagram showing the configuration of an analysis system including an analysis assistance device according to one embodiment of the present invention.
Figure 2:
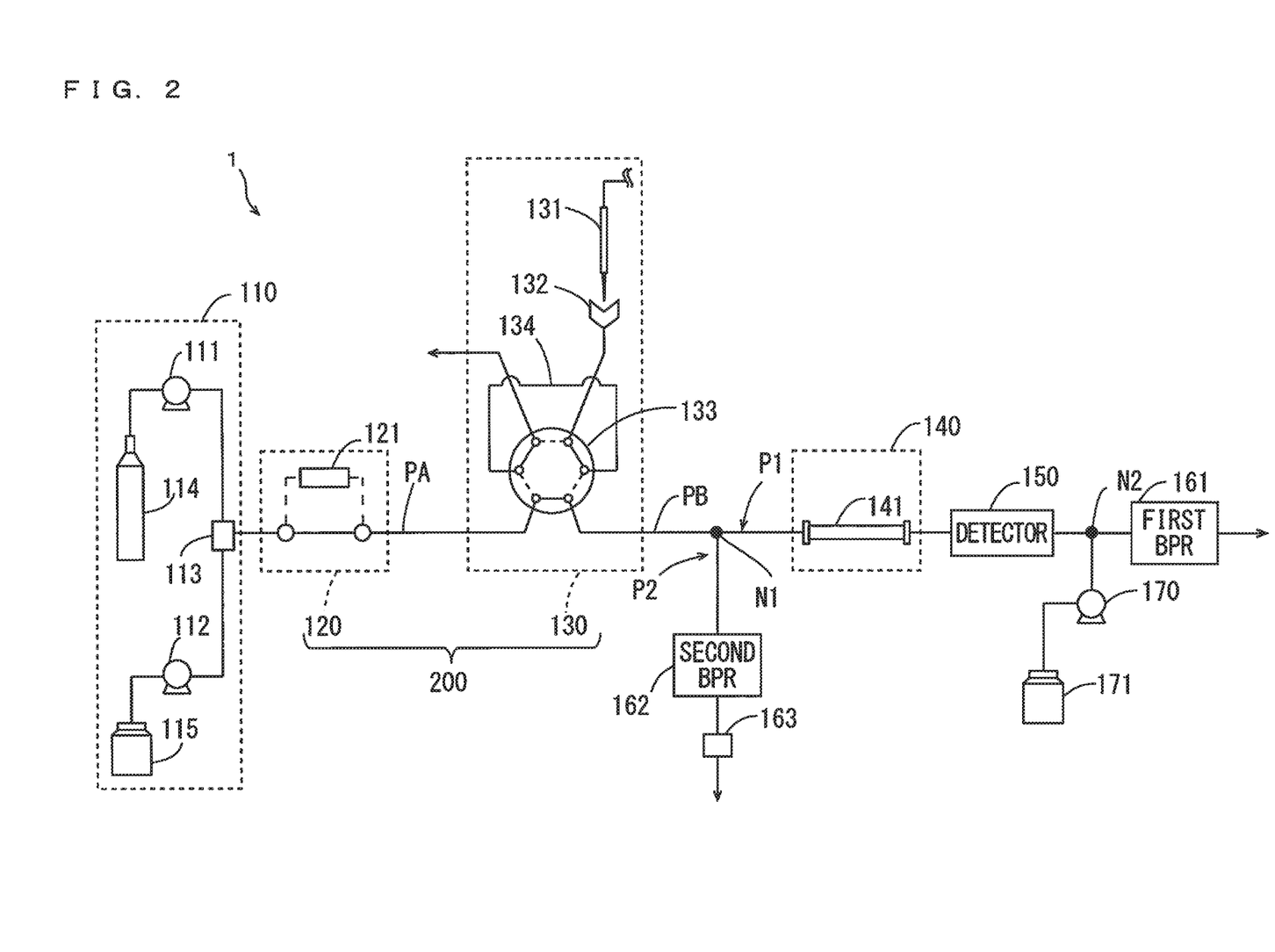
FIG. 2 is a schematic diagram showing the configuration of a supercritical fluid chromatograph included in the analysis system of FIG. 1.

FIG. 1 is a block diagram showing the configuration of the analysis system including the analysis assistance device according to one embodiment of the present invention. FIG. 2 is a schematic diagram showing the configuration of a supercritical fluid chromatograph included in the analysis system of FIG. 1.

The analysis system 100 of FIG. 1 includes the supercritical fluid chromatograph 1 and the analysis assistance device 3. First, the supercritical fluid chromatograph 1 shown in FIG. 2 will be described. In the present embodiment, $CO_2$ (carbon dioxide) is used as a supercritical fluid.

The supercritical fluid chromatograph 1 includes a liquid sender 110, a supercritical fluid extractor 120, an autosampler 130, a column oven 140, a detector 150, a first back pressure regulator (hereinafter referred to as a BPR) 161, a second back pressure regulator (hereinafter referred to as a BPR) 162 and a makeup pump 170. In the present embodiment, the supercritical fluid extractor 120 and the autosampler 130 constitute a sample introducer 200.

The liquid sender 110 includes a $CO_2$ pump 111, a modifier pump 112 and a mixer 113. The $CO_2$ pump 111 extracts $CO_2$ from a cylinder 114 while pressurizing $CO_2$. The $CO_2$ pump 111 has a pressure meter for detecting a discharge pressure and a monitor for displaying a pressure value. The modifier pump 112 extracts a modifier, which is a polar solvent, from a modifier container 115. As the modifier, methanol or ethanol is used, for example.

The mixer 113 mixes the $CO_2$ extracted by the $CO_2$ pump 111 with the modifier extracted by the modifier pump 112, and supplies a liquid mixture to a supply flow path PA as a mobile phase. In the present embodiment, the mixer 113 is a gradient mixer that mixes $CO_2$ with the modifier at a set ratio.

The supply flow path PA is provided with the supercritical fluid extractor 120. The supercritical fluid extractor 120 includes an extraction container 121 that stores a sample. During the analysis of the sample, the supercritical fluid extractor 120 extracts a component to be analyzed from the sample as a sample component using a supercritical fluid ($CO_2$ in the present embodiment) included in the mobile phase. The extracted sample component and the mobile phase are supplied to the supply flow path PA.

The autosampler 130 includes a needle 131, an injection port 132, a switching valve 133 and a sample loop 134. The needle 131 sucks a reference sample and discharges the reference sample to the injection port 132. The sample loop 134 temporarily retains the reference sample that has been injected to the injection port 132. The supply flow path PA, the supply flow path PB, the injection port 132 and the sample loop 134 are connected to the switching valve 133. The switching valve 133 can switch between a first state and a second state, the first state being the state where the supply flow path PA is connected to the supply flow path PB and the injection port 132 is connected to the sample loop 134, and the second state being the state where the supply flow path PA, the sample loop 134 and the supply flow path PB are connected to one another.

The supply flow path PB branches into a first flow path P1 and a second flow path P2 at a branch portion N1. The column oven 140 stores an analysis column 141 and keeps the temperature in the analysis column 141 at a set temperature. In the first flow path P1, the analysis column 141, the detector 150 and the first BPR 161 are provided in order. The sample component and the mobile phase are introduced into the analysis column 141. The analysis column 141 separates the sample component into further specific components. The separated components are detected by the detector 150. The detector 150 is an ultraviolet detector, for example.

The first BPR 161 operates to keep the suction pressure (the pressure in the downstream of the detector 150 in the present embodiment) at a set value. The pressure in the downstream of the first BPR 161 is an air pressure. The makeup pump 170 extracts a makeup liquid from the makeup container 171 and supplies the makeup liquid to a junction N2 with the first flow path P1.

The second flow path P2 is provided with the second BPR 162. The second BPR 162 operates to keep the suction pressure (the pressure in the second flow path P2 in the present embodiment) at a set value. A flow rate sensor 163 is provided in a drain of the second BPR 162. The flow rate sensor 163 is used to detect the stop of discharge of the mobile phase from the drain of the second BPR 162 (the flow rate of the mobile phase has become 0). The flow rate sensor 163 does not have to be provided. In that case, a user visually detects the stop of the discharge of the mobile phase from the drain, or the second BPR 162 being put into a closed state.

The set value of the pressure in the first BPR 161 and the set value of the pressure in the second BPR 162 are adjusted, whereby $CO_2$ in the supply flow paths PA, PB, the first flow path P1 and the second flow path P2 is put into a supercritical state. Further, the set value of the pressure in the first BPR 161 and the set value of the pressure in the second BPR 162 are adjusted, whereby the ratio (hereinafter referred to as a sample introduction ratio) of the flow rate of the sample introduced into the first flow path P1 to the flow rate of the sample introduced into the second flow path P2 is changed. The sample introduction ratio is equivalent to the ratio of the flow rate of the mobile phase supplied to the first flow path P1 to the flow rate of the mobile phase supplied to the second flow path P2. The sample introduction ratio is also referred to as a split ratio. For example, it may be preferable that the amount of sample introduced into the supercritical fluid extractor 120 is large, and it may be preferable that the amount of sample introduced into the analysis column 141 is relatively small. In such a case, it is possible to respectively adjust the flow rates of the samples respectively introduced into the supercritical fluid extractor 120 and the analysis column 141 to suitable values by adjusting the sample introduction ratio.

As shown in FIG. 1, the supercritical fluid chromatograph 1 includes a control device 180. The control device 180 controls the $CO_2$ pump 111, the modifier pump 112, the mixer 113, the supercritical fluid extractor 120 and the autosampler 130. Further, the control device 180 controls the column oven 140, the first BPR 161, the second BPR 162, the detector 150 and the makeup pump 170. Further, the control device 180 acquires a pressure value from the pressure meter of the $CO_2$ pump 111 and acquires a value of the flow rate detected by the flow rate sensor 163.

The analysis assistance device 3 includes an input output I/F (interface) 31, a CPU (Central Processing Unit) 32, a RAM (Random Access Memory) 33, a ROM (Read Only Memory) 34 and a storage device 35, and is constituted by a personal computer or a server, for example. The input output I/F 31, the CPU 32, the RAM 33, the ROM 34 and the storage device 35 are connected to a bus 38. An operation unit 36 and a display 37 are connected to the bus 38 of the analysis assistance device 3. The operation unit 36 includes a keyboard, a pointing device and the like, and is used for input of various values and so on, and various operations. The display 37 includes a liquid crystal display, an organic electroluminescence display or the like, and displays various information and images. The operation unit 36 and the display 37 may be constituted by a touch panel display.

The storage device 35 includes a storage medium such as a hard disk, an optical disc, a magnetic disc, a semiconductor memory or a memory card, and stores the analysis assistance program. The RAM 33 is used as a work area for the CPU 32. A system program is stored in the ROM 34. The CPU 32 executes the analysis assistance program stored in the storage device 35 on the RAM 33, whereby the below-mentioned analysis assistance method is performed.

(2) Method of Adjusting Sample Introduction Ratio

The method of adjusting the sample introduction ratio will be described below. As the method of analyzing a sample, the sample introduction ratio, the type of the analysis column 141 (the inner diameter of the analysis column, the length of the analysis column and a filler), the total flow rate of a mobile phase, the type of a modifier, the concentration of a modifier, the type of a makeup liquid, the set value of the pressure in the second BPR 162 and so on are prescribed in the analysis method. The supply flow path PA and the supply flow path PB are connected to each other through the switching valve 133.

First, the user installs the analysis column 141 prescribed in the analysis method and the modifier container 115 in the supercritical fluid chromatograph 1. Next, the user or the analysis assistance device 3 sets the pressure in the second BPR 162 to a second set value prescribed in the analysis method. Further, the user installs the makeup container 171 storing the makeup liquid prescribed in the analysis method in the supercritical fluid chromatograph 1 as necessary.

In this state, the pressure in the first BPR 161 is set to a value higher than the second set value by a user's operation using the operation unit 36 or an instruction given by the analysis assistance device 3. Further, the liquid sender 110 supplies a mobile phase having a prescribed concentration of modifier to the supply flow paths PA, PB at a predetermined flow rate by a user's operation using the operation unit 36 or an instruction given by the analysis assistance device 3. Here, the predetermined flow rate is the flow rate of a mobile phase that is to be theoretically supplied to the first flow path P1 when the mobile phase is supplied to the supply flow paths PA, PB at a prescribed total flow rate and a prescribed sample introduction ratio. For example, when the total flow rate of the mobile phase is 5 mL/min, and the sample introduction ratio is 5%, the mobile phase is to be supplied to the first flow path P1 theoretically at the flow rate of 0.25 mL/min. Therefore, the liquid sender 110 supplies the mobile phase to the supply flow paths PA, PB at the flow rate of 0.25 mL/min. The mobile phase is supplied to the first flow path P1 and the second flow path P2 at first.

The set value of the pressure in the first BPR 161 decreases by a certain value (0.1 MPa, for example) at a time by a user's operation using the operation unit 36 or an instruction given by the analysis assistance device 3. Thus, the flow rate of the mobile phase in the second flow path P2 gradually decreases.

The analysis assistance device 3 detects the set value of the pressure in the first BPR 161 at the time when the flow rate of the mobile phase detected by the flow rate sensor 163 becomes 0, as a first set value. Alternatively, the user inputs the set value of the pressure in the first BPR 161 at the time when the discharge of the mobile phase from the drain of the second BPR 162 is stopped or when the second BPR 162 is put into the closed state, as the first set value. The difference between the first set value of the pressure in the first BPR 161 and the second set value of the pressure in the second BPR 162 in this case is the difference in pressure acquired when the mobile phase is introduced into the analysis column 141 at the predetermined flow rate (the flow rate theoretically calculated from the prescribed total flow rate and the prescribed sample introduction ratio).

In this manner, the first set value of the pressure in the first BPR 161, which is to be set in order that the prescribed total flow rate of the mobile phase is supplied to the first BPR 161 and the second BPR 162 at the prescribed sample introduction ratio, is determined.

(3) Functional Configuration of Analysis Assistance Device 3

Figure 3:
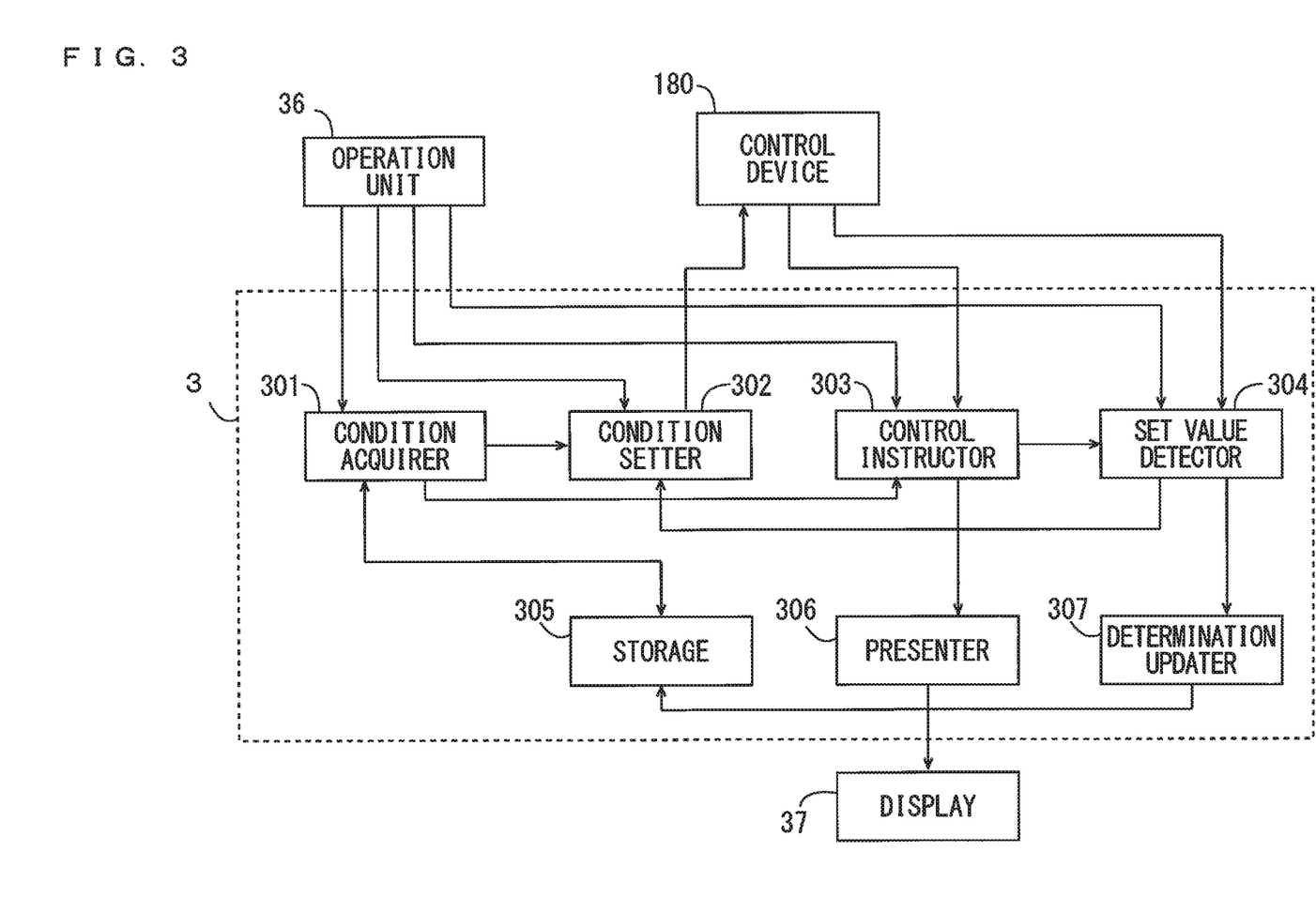
FIG. 3 is a block diagram showing the functional configuration of the analysis assistance device of FIG. 1.

FIG. 3 is a block diagram showing the functional configuration of the analysis assistance device 3 of FIG. 1. As shown in FIG. 3, the analysis assistance device 3 includes a condition acquirer 301, a condition setter 302, a control instructor 303, a set value detector 304, a storage 305, a presenter 306 and a determination updater 307. The functions of the above-mentioned constituent elements (301 to 307) are realized by execution of the analysis assistance program, which is a computer program stored in a storage medium (recording medium) such as the storage device 35, by the CPU 32 of FIG. 1. Part or all of the constituent elements of the analysis assistance device 3 may be realized by hardware such as an electronic circuit.

One or a plurality of analysis methods are stored in the storage 305. The condition acquirer 301 acquires analysis conditions such as various set values input by the user using the operation unit 36 or analysis conditions prescribed by the analysis method stored in the storage 305. The condition setter 302 performs settings of each component of the supercritical fluid chromatograph 1 through the control device 180 of the supercritical fluid chromatograph 1 based on the analysis conditions acquired by the condition acquirer 301. The control instructor 303 instructs the control device 180 to control each component of the supercritical fluid chromatograph 1 based on various instructions input by the user using the operation unit 36 or the analysis conditions acquired by the condition acquirer 301.

The set value detector 304 detects the set value of the pressure in the first BPR 161 at the time when the flow of the mobile phase into the drain of the second BPR 162 is stopped, as the first set value. Specifically, the set value detector 304 detects the set value of the pressure in the first BPR 161 at the time when the flow rate of the mobile phase detected by the flow rate sensor 163 becomes 0, as the first set value. Alternatively, the user may see the set value of the pressure in the first BPR 161 at the time when the discharge of the mobile phase from the drain of the second BPR 162 is stopped or when the second BPR 162 is closed, and may input the set value as the first set value using the operation unit 36. In this case, the set value detector 304 detects the input first set value.

The determination updater 307 determines the first set value of the pressure in the first BPR 161 detected by the set value detector 304 as part of the analysis conditions of the analysis method in the storage 306, or updates the set value of the pressure in the first BPR 161 prescribed in the analysis method with the first set value. The above-mentioned condition setter 302 sets the first set value detected by the set value detector 304 in the first BPR 161 of the supercritical fluid chromatograph 1 through the control device 180.

The presenter 306 determines whether the set value of the pressure in the first BPR 161 is lower than a predetermined threshold value in the process in which the set value of the pressure in the first BPR 161 decreases. When the set value of the pressure in the first BPR 161 is lower than the threshold value, the presenter 306 presents the warning to indicate an occurrence of a problem such as clogging in the first or second flow path P1, P2 to the user by the display 37. In this case, the control instructor 303 stops the operation of the supercritical fluid chromatograph 1.

(4) Analysis Assistance Program

Figure 4:
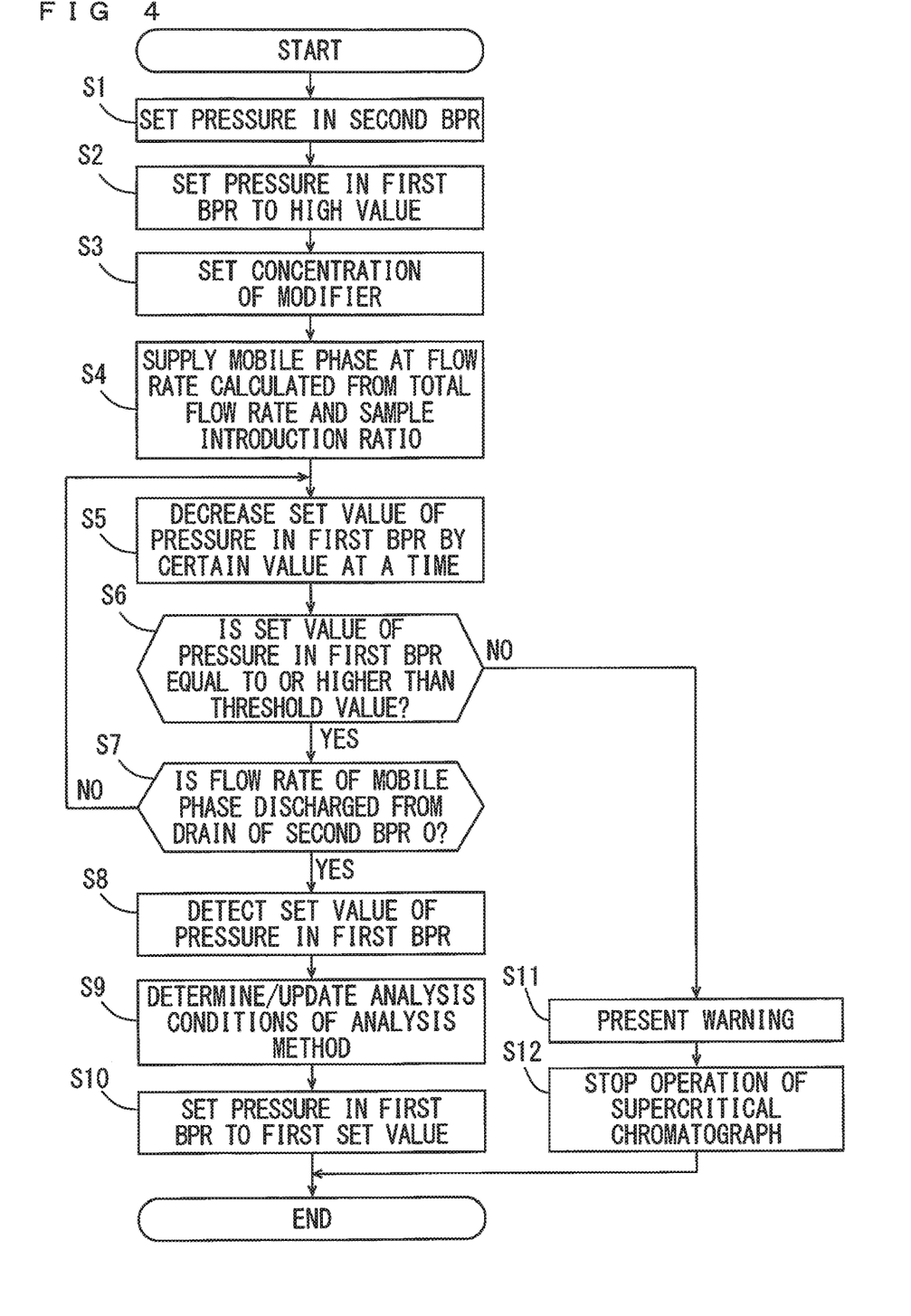
FIG. 4 is a flow chart showing the algorithm of an analysis assistance program.

FIG. 4 is a flow chart showing the algorithm of the analysis assistance program. The algorithm of the analysis assistance program will be described with reference to FIG. 4. The analysis assistance method is performed by execution of the analysis assistance program.

First, the condition setter 302 sets the pressure in the second BPR 162 to the second set value prescribed in the analysis method (step S1). More specifically, the user may input the second set value of the pressure in the second BPR 162 using the operation unit 36. In this case, the condition acquirer 301 acquires the input second set value, and the condition setter 302 sets the acquired second set value in the second BPR 162 through the control device 180. Further, the condition acquirer 301 may acquire the set value of the pressure in the second BPR 162 prescribed in the analysis method in the storage 305 as the second set value, and the condition setter 302 may set the acquired second set value in the second BPR 162 through the control device 180. Alternatively, the user may directly set the second set value in the second BPR 162 of the supercritical fluid chromatograph 1.

Next, the condition setter 302 sets the pressure in the first BPR 161 to a predetermined value higher than the second set value of the pressure in the second BPR 162 through the control device 180 (step S2). Further, the condition setter 302 sets the concentration of modifier in the liquid sender 110 through the control device 180 (step S3). Specifically, the user inputs the prescribed concentration of modifier using the operation unit 36. In this case, the condition acquirer 301 acquires the input concentration of modifier, and the condition setter 302 sets the acquired concentration of modifier in the liquid sender 110. Alternatively, the condition setter 302 may set the concentration of modifier in the liquid sender 110 based on the analysis method stored in the storage 305.

Next, the control instructor 303 instructs the control device 180 to supply a mobile phase to the supply flow path PA at a predetermined flow rate that is calculated from the prescribed total flow rate and the prescribed sample introduction ratio (step S4). Thus, the control device 180 controls the liquid sender 110 such that the mobile phase is supplied to the supply flow path PA at the predetermined flow rate.

Thereafter, the control instructor 303 instructs the control device 180 to decrease the set value of the pressure in the first BPR 161 by a certain value (0.1 MPa, for example) at a time (step S5). Thus, the control device 180 decreases the set value of the pressure in the first BPR 161 by the certain value at a time.

The presenter 306 determines whether the set value of the pressure in the first BPR 161, which is decreased by an instruction given by the control instructor 303, is equal to or higher than the threshold value (step S6). In this case, the presenter 306 may acquire the set value of the pressure in the first BPR 161 based on the instruction of decreasing the set value given by the control instructor 303, or may acquire the set value of the pressure in the first BPR 161 from the control device 180. Here, the threshold value is a threshold value for determination of whether a problem such as clogging has occurred in the first or second flow path P1, P2 and is 8 Mpa, for example.

When the set value of the pressure in the first BPR 161 is equal to or higher than the threshold value, the set value detector 304 determines whether the flow rate of the mobile phase discharged from the drain of the second BPR 162 is 0 (step S7). When the flow rate of the mobile phase discharged from the drain of the second BPR 162 is not 0, the control instructor 303 returns to the step S5 and repeats the process of the steps S5 to S7.

When the flow rate of the mobile phase discharged from the drain of the second BPR 162 becomes 0, the set value detector 304 detects the set value of the pressure in the first BPR 161 as the first set value (step S8). The detected first set value is stored in the storage 305. The determination updater 307 determines or updates the first set value as part of the analysis conditions of the analysis method (step S9). Specifically, the determination updater 307 determines the first set value as part of the analysis conditions of the analysis method stored in the storage 305. Alternatively, when the set value of the pressure in the first BPR 161 is prescribed in the analysis method, the determination updater 307 updates the prescribed set value with the first set value. The condition setter 302 sets the pressure in the first BPR 161 to the first set value detected by the set value detector 304 (step S10).

When the set value of the pressure in the first BPR 161 is lower than the threshold value in the step S6, the presenter 306 presents warning to the user by the display 37 (step S11). Further, the control instructor 303 instructs the control device 180 to stop the operation of the supercritical fluid chromatograph 1 (step S12).

(5) Effects of Embodiment

The present embodiment allows the pressure in the first BPR 161 to be set to a value higher than the prescribed second set value with the pressure in the second BPR 162 set to the second set value. In this state, the mobile phase is supplied to the supply flow paths PA, PB at the flow rate of the mobile phase that is to be theoretically supplied to the first flow path P1 when the mobile phase is supplied to the supply flow paths PA, PB at the prescribed total flow rate and the prescribed sample introduction ratio. In this case, the mobile phase is supplied at least to the second flow path P2. Thereafter, the set value of the pressure in the first BPR 161 gradually decreases. Thus, the flow rate of the mobile phase supplied to the first flow path P1 increases, and the flow rate of the mobile phase supplied to the second flow path P2 decreases. The set value of the pressure in the first BPR 161 at the time when the supply of the mobile phase to the second flow path P2 is stopped is detected as the first set value. The first set value is equivalent to the set value of the pressure in the first BPR 161 at which the predetermined flow rate of the mobile phase is supplied to the first flow path P1 at the prescribed sample introduction ratio. Therefore, it is possible to determine the set value of the pressure in the first BPR 161 to acquire a desired sample introduction ratio in a short period of time without carrying out the analysis. Further, it is possible to determine the set value of the pressure in the first BPR 161 without being influenced by another factor such as sensitivity of the detector 150. Therefore, the sample introduction ratio can be easily and reliably adjusted.

Further, for various samples, the analysis method including sample introduction ratios, first set values of the pressure in the first BPR 161 and second set values of the pressure in the second BPR 162 can be easily created and updated.

Further, the user can easily identify an occurrence of a problem such as clogging in the first or second flow path P1, P2 based on the warning presented by the display 37.

(6) Other Embodiments (a) The user may directly set part of the values of a plurality of analysis conditions in a corresponding component of the supercritical fluid chromatograph 1.

(b) While the sample introducer 200 includes the supercritical fluid extractor 120 and the autosampler 130 in the above-mentioned embodiment, the sample introducer 200 may include either one of the supercritical fluid extractor 120 and the autosampler 130.

(7) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the condition setter 302 is an example of a setter, the control instructor 303 is an example of an instructor and the set value detector 304 is an example of a detector.

As each of constituent elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

I claim:

1. An analysis assistance method of assisting determination of an analysis condition of a supercritical fluid chromatograph including a liquid sender that supplies a mobile phase including a supercritical fluid to a supply flow path, first and second back pressure regulators respectively provided in first and second flow paths into which the supply flow path branches and an analysis column provided at an upstream of the first back pressure regulator in the first flow path, including:
    setting pressure in the first back pressure regulator to a value higher than a prescribed second set value with pressure in the second back pressure regulator set to the second set value;
    instructing the supercritical fluid chromatograph to supply the mobile phase to the supply flow path at a flow rate of the mobile phase that is to be theoretically supplied to the first flow path when the mobile phase is supplied to the supply flow path at a prescribed total flow rate and a prescribed sample introduction ratio, and then instructing the supercritical fluid chromatograph to gradually decrease a set value of the pressure in the first back pressure regulator; and
    detecting a set value of the pressure in the first back pressure regulator at the time when supply of the mobile phase to the second flow path is stopped due to a decrease in set value of the pressure in the first back pressure regulator, as a first set value.

2. The analysis assistance method according to claim 1, further including setting the pressure in the first back pressure regulator to the detected first set value.

3. The analysis assistance method according to claim 1, further including:
    storing the analysis condition including the prescribed sample introduction ratio, the prescribed total flow rate of the mobile phase and the prescribed second set value; and
    determining or updating the detected first set value as part of the analysis condition.

4. The analysis assistance method according to claim 1, further including presenting warning when the gradually decreasing set value of the pressure in the first back pressure regulator decreases to a value lower than a predetermined threshold value.

5. An analysis assistance device that assists determination of an analysis condition of a supercritical fluid chromatograph including a liquid sender that supplies a mobile phase including a supercritical fluid to a supply flow path, first and second back pressure regulators respectively provided in first and second flow paths into which the supply flow path branches and an analysis column provided at an upstream of the first back pressure regulator in the first flow path, comprising:
    a setter that sets pressure in the first back pressure regulator to a value higher than a prescribed second set value with pressure in the second back pressure regulator set to the second set value;
    an instructor that instructs the supercritical fluid chromatograph to supply the mobile phase to the supply flow path at a flow rate of the mobile phase that is to be theoretically supplied to the first flow path when the mobile phase is supplied to the supply flow path at a prescribed total flow rate and a prescribed sample introduction ratio, and then instructs the supercritical fluid chromatograph to gradually decrease a set value of the pressure in the first back pressure regulator; and
    a detector that detects a set value of the pressure in the first back pressure regulator at the time when supply of the mobile phase to the second flow path is stopped due to a decrease in set value of the pressure in the first back pressure regulator, as a first set value.

6. The analysis assistance device according to claim 5, wherein
    the setter sets the pressure in the first back pressure regulator to the detected first set value.

7. The analysis assistance device according to claim 5, further comprising:
    a storage that stores the analysis condition including the prescribed sample introduction ratio, the prescribed total flow rate of the mobile phase and the prescribed second set value; and
    a determination updater that determines or updates the detected first set value as part of the analysis condition.

8. The analysis assistance device according to claim 5, further comprising a presenter that presents warning when the gradually decreasing set value of the pressure in the first back pressure regulator based on an instruction given by the instructor decreases to a value lower than a predetermined threshold value.

9. An analysis system comprising:
    a supercritical fluid chromatograph including a liquid sender that supplies a mobile phase including a supercritical fluid, first and second back pressure regulators respectively provided in first and second flow paths into which the supply flow path branches and an analysis column provided at an upstream of the first back pressure regulator in the first flow path, and
    the analysis assistance device according to claim 5 that assists determination of an analysis condition of the supercritical fluid chromatograph.

10. A non-transitory computer readable medium storing an analysis assistance program for assisting determination of an analysis condition of a supercritical fluid chromatograph that includes a liquid sender that supplies a mobile phase including a supercritical fluid to a supply flow path, first and second back pressure regulators respectively provided in first and second flow paths into which the supply flow path branches and an analysis column provided at an upstream of the first back pressure regulator in the first flow path, the analysis assistance program allowing a computer to execute:
    a process of setting pressure in the first back pressure regulator to a value higher than a prescribed second set value with pressure in the second back pressure regulator set to the second set value;
    a process of instructing the supercritical fluid chromatograph to supply the mobile phase to the supply flow path at a flow rate of the mobile phase that is to be theoretically supplied to the first flow path when the mobile phase is supplied to the supply flow path at a prescribed total flow rate and a prescribed sample introduction ratio, and then instructing the supercritical fluid chromatograph to gradually decrease a set value of the pressure in the first back pressure regulator; and a process of detecting a set value of the pressure in the first back pressure regulator at the time when supply of the mobile phase to the second flow path is stopped due to a decrease in set value of the pressure in the first back pressure regulator, as a first set value.

\* \* \* \* \*